United States Patent
McNeill, Jr. et al.

(10) Patent No.: US 7,185,118 B2
(45) Date of Patent: Feb. 27, 2007

(54) RELIABLE USE OF DESKTOP CLASS DISK DRIVES IN ENTERPRISE STORAGE APPLICATIONS

(75) Inventors: Andrew B. McNeill, Jr., Morrisville, NC (US); Kenneth R. Schneebeli, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 10/762,113

(22) Filed: Jan. 21, 2004

(65) Prior Publication Data

US 2005/0160189 A1 Jul. 21, 2005

(51) Int. Cl.
G06F 3/00 (2006.01)
G06F 11/34 (2006.01)
G06F 13/14 (2006.01)
G06F 13/00 (2006.01)

(52) U.S. Cl. .............................. 710/6; 710/15; 710/18; 714/47

(58) Field of Classification Search .................... 710/5, 710/6, 15–19, 36, 58, 59; 714/47
See application file for complete search history.

(56) References Cited

U.S. PATENT DOCUMENTS

| | | | |
|---|---|---|---|
| 4,987,502 A * | 1/1991 | Freeze | 360/75 |
| 5,544,138 A * | 8/1996 | Bajorek et al. | 369/53.42 |
| 5,682,273 A * | 10/1997 | Hetzler | 360/75 |
| 5,819,053 A | 10/1998 | Goodrum et al. | |
| 6,493,739 B1 | 12/2002 | Dolin, Jr. et al. | |
| 6,512,652 B1 * | 1/2003 | Nelson et al. | 360/78.01 |
| 6,563,655 B1 | 5/2003 | Yamasaki et al. | |
| 6,845,404 B2 * | 1/2005 | Moczygemba | 710/6 |
| 6,862,691 B2 * | 3/2005 | Hayden | 714/6 |
| 6,934,673 B2 * | 8/2005 | Alvarez et al. | 703/21 |
| 2005/0002293 A1* | 1/2005 | Hsu et al. | 369/47.5 |
| 2005/0132133 A1* | 6/2005 | Keohane et al. | 711/112 |

FOREIGN PATENT DOCUMENTS

WO  WO 01/06362 A1  1/2001

* cited by examiner

Primary Examiner—Kim Huynh
Assistant Examiner—Scott Sun
(74) Attorney, Agent, or Firm—Sawyer Law Group LLP

(57) ABSTRACT

Aspects of increasing the quality and reliability of desktop class storage disks in enterprise storage applications are described. The aspects include monitoring a number of idle states and busy states in a disk drive, and limiting performance of read/write commands by the disk drive based on whether a sufficient number of idle states has been monitored to avoid exceeding a duty cycle rating of the disk drive.

4 Claims, 2 Drawing Sheets

| Time at end of time period x | Timer/counter variable T at end of period | Disk drive state (Idle/Busy/Delay) | Command #'s waiting | Running average duty cycle % |
|---|---|---|---|---|
| 1 | 1 | Idle | None | 0 |
| 2 | 2 | Idle | None | 0 |
| 3 | 3 | Idle | None | 0 |
| 4 | 0 | Busy - Command #1 | None | 25 |
| 5 | -3 | Busy - Command #1 | None | 40 |
| 6 | -2 | Delay | Command #2 | 33 |
| 7 | -1 | Delay | Command #2 | 29 |
| 8 | 0 | Delay | Command #2 | 25 |
| 9 | -3 | Busy - Command #2 | None | 33 |
| 10 | -6 | Busy - Command #2 | None | 40 |
| 11 | -5 | Delay | Command #3 | 36 |
| 12 | -4 | Delay | Command #3 | 33 |
| 13 | -3 | Delay | Command #3 | 31 |
| 14 | -2 | Delay | Command #3 | 29 |
| 15 | -1 | Delay | Command #3 | 27 |
| 16 | 0 | Delay | Command #3 | 25 |
| 17 | -3 | Busy - Command #3 | None | 29 |
| 18 | -6 | Busy - Command #3 | None | 33 |
| 19 | -9 | Busy - Command #3 | None | 37 |
| 20 | -8 | Delay | None | 35 |
| 21 | -7 | Delay | None | 33 |
| 22 | -6 | Delay | None | 32 |
| 23 | -5 | Delay | None | 30 |
| 24 | -4 | Delay | None | 29 |
| 25 | -3 | Delay | None | 28 |
| 26 | -2 | Delay | None | 27 |
| 27 | -1 | Delay | None | 26 |
| 28 | 0 | Delay | None | 25 |
| 29 | 1 | Idle | None | 24 |
| 30 | 2 | Idle | None | 23 |

FIG. 3

RELIABLE USE OF DESKTOP CLASS DISK DRIVES IN ENTERPRISE STORAGE APPLICATIONS

FIELD OF THE INVENTION

The present invention relates to disk drives, and more particularly to increasing the quality and reliability of desktop class disks in enterprise storage applications.

BACKGROUND OF THE INVENTION

In order to reduce the cost of storage systems, vendors have begun to use "desktop class" (e.g., IDE or Serial ATA) disk drives in server applications and in enterprise class storage systems. Traditionally, so-called "enterprise" class disk drives with SCSI or Fibre Channel (FC) interfaces have been used in these type applications that typically demand high performance and high reliability. Enterprise class disk drives (e.g., SCSI and FC) are generally designed for high-performance, 24 hour a day/7 days a week (24/7) operation, and high duty cycle applications where a high number of I/O (input/output) operations per second are typically performed by the hard disk drives (e.g., databases, e-mail, transaction processing, web serving, etc.). These enterprise disk class disks are generally designed, manufactured, and tested to work reliably while meeting these demanding application requirements. Typically, enterprise class disk drives use 10,000 RPM (revolutions per minute) or higher spindle speeds, support average seek times under 5 ms (milliseconds), and have MTBF (mean time between failure) rates over 1 million hours based on 720 power on hours per month (24/7) operation and high duty cycle workloads (e.g., seeking, reading, or writing) in the 70–80% active range. These SCSI or FC disks generally cost 3 to 6 times more per gigabyte (GB) of capacity than IDE or Serial ATA disks.

As compared to the enterprise class disk drives, traditional desktop class hard disk drives (IDE or Serial ATA) are generally designed to meet lower performance and reliability requirements, for lower power-on hours per month, and lower duty cycle applications. Typical desktop IDE class disks use 7200 RPM or slower spindle speeds, support average seek times greater than 5 ms, have MTBF ratings in the 500,000 hour range based on less than 250 power-on hours per month and low duty cycle workloads in the 30% active range.

Most storage subsystems that are using desktop class IDE and Serial ATA disk drives are being marketed for use in low duty cycle applications such as data backup (i.e. tape replacement), archival data storage, or for so-called near-line storage of reference data (e.g., medical imaging, etc.), which is typically accessed infrequently but which is desired to be readily available when needed. These applications are targeted for the use of desktop class disks because of the inherent lower performance of these disks compared to SCSI or FC disks, as well as the inherent application characteristics for lower duty cycle usage.

Although storage systems that use desktop class disks may be marketed for use in applications that have low usage or duty cycle access patterns, there is nothing that prevents them from being used in applications that exceed the rated duty cycle of these disks. In this case, the storage system manufacturers can expect to see a much higher failure rate for these disks than would be normally expected, leading to higher warranty expenses, and lower overall profit over the life of the product. There are MTBF de-rating factors that would need to be applied based on actual power-on hours, actual duty cycle, etc., in order to determine the real expected reliability of these disk drives when used in enterprise applications. Also, customer expectations for quality may not be met due to excessive repair actions and potential loss of customer data due to multiple disk failures in a RAID-5 array of desktop class disks, for example.

Since the trend of using desktop class disks in enterprise storage applications is a recent occurrence in the industry, vendors have not recognized nor adequately addressed these issues. Accordingly, a need exists for improving the quality and reliability of desktop class disks in enterprise storage applications. The present invention addresses such a need.

SUMMARY OF THE INVENTION

Aspects of increasing the quality and reliability of desktop class storage disks in enterprise storage applications are described. The aspects include monitoring a number of idle states and busy states in a disk drive, and limiting performance of read/write commands by the disk drive based on whether a sufficient number of idle states has been monitored to avoid exceeding a duty cycle rating of the disk drive.

Thus, through the present invention, a general self-limiting algorithm is achieved that allows for the average duty cycle to be limited based on a rolling average over a selectable time period to let the disk drive respond quickly to periods of high I/O activity without significantly decreasing the disk drive's performance but still limit the average duty cycle over a longer period of time in order to make sure the disk drive's intended duty cycle specifications are not exceeded. Further, the general self-limiting algorithm includes control parameters that can be customized for each individual model of disk drive that employs the invention. The above as well as additional objectives, features, and advantages of the present invention will become apparent in the following detailed written description in conjunction with the accompanying figures.

BRIEF DESCRIPTION OF THE DRAWINGS

FIG. 3 illustrates a table for a working example in accordance with the present invention.

DETAILED DESCRIPTION

The present invention relates to increasing the quality and reliability of desktop class disks in enterprise storage applications. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
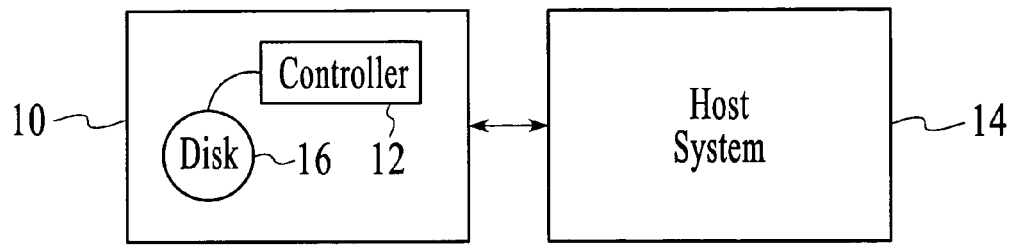
FIG. 1 illustrates a basic block diagram of components of a disk drive system included in the present invention.

The present invention provides a method for automatically limiting the duty cycle of a disk drive in order to avoid exceeding its intended usage which can lead to premature disk drive failure. FIG. 1 illustrates a basic block diagram of components of a disk drive system included in the present invention. In general, disk drives 10 employ a microprocessor-based interface controller 12 that accepts read/write commands from a host system 14, such as a host adapter or RAID controller of a processing system, interprets those commands, activates a disk seek mechanism to position a read/write head over the desired data area on a disk 16, and controls the transfer of the data to/from the disk 16 media and the host system 14. The controller 12 typically has some kind of timer capability that is used to keep track of time for performing time-outs on internal disk drive operation and for generating time-stamps on error log entries, for example. Implementation of the present invention suitably occurs as an algorithm in the embedded firmware program (on a suitable computer readable medium) that executes on the controller 12 that controls overall operation of the disk drive 10. Since each disk drive 10 can have a different rating for maximum duty cycle, the invention allows for a general self-limiting algorithm that can have control parameters that can be customized for each individual model of disk drive that employs the invention.

The desired maximum duty cycle for each disk drive will depend on the design and intended use of the disk drive. The disk drive duty cycle can be expressed as a ratio=Ta/t for a given time period t where Ta is the amount of time the disk drive is actively processing read/write commands during the time period. For example, if during a time period t=60 seconds, the disk drive was actively processing read/write commands for a collective total of Ta=15 seconds, then the average duty cycle for that time period would be 25%. For ease of implementing the invention with standard control microprocessors, the desired target duty cycle should be determined and expressed in reduced form as a ratio of positive integers (e.g., ¼=25% duty cycle). In the remaining discussion, the numerator of this ratio will be referred to as N and the denominator will be referred to as M.

Figure 2:
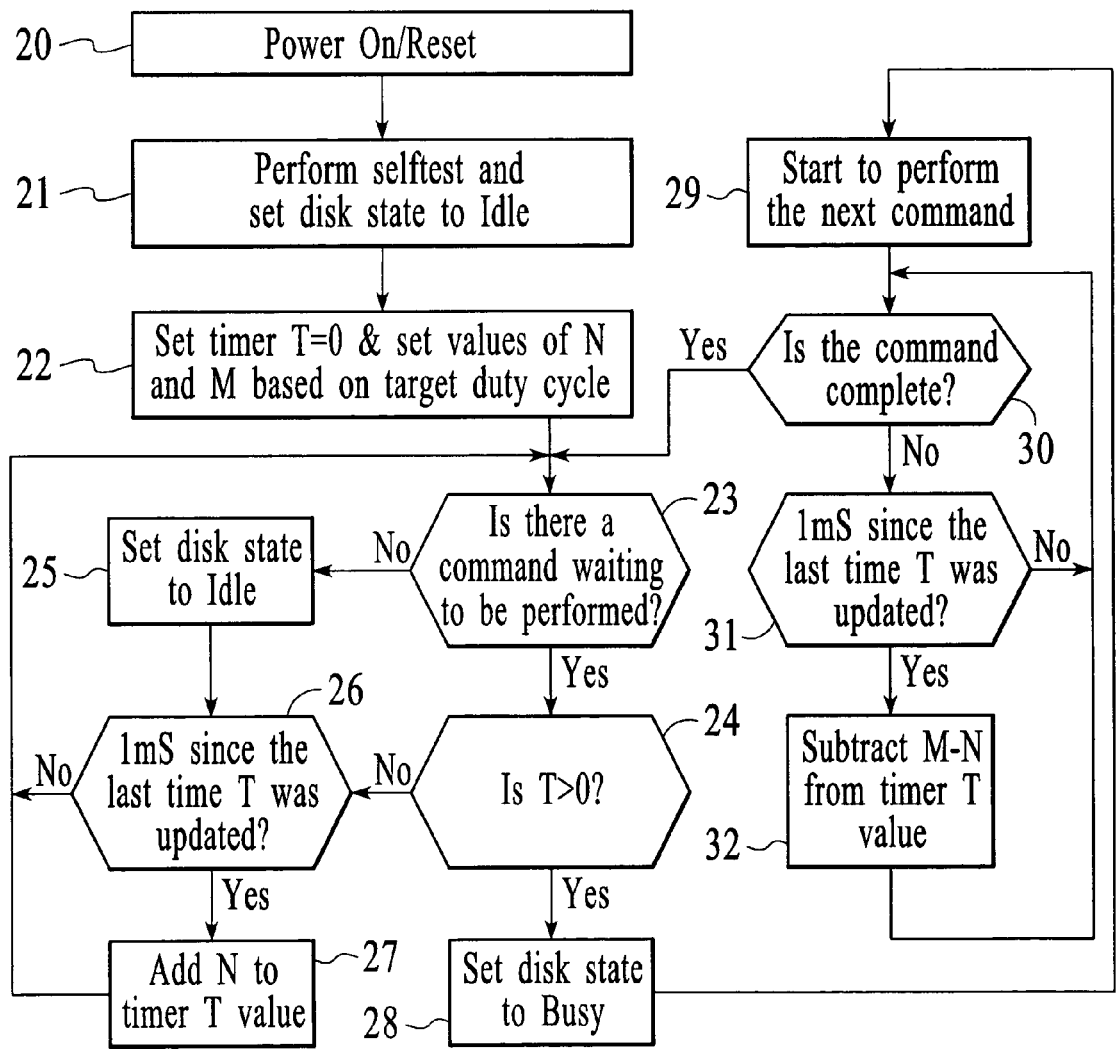
FIG. 2 illustrates a block flow diagram representation of a self-limiting method for a disk drive system in accordance with the present invention.

Referring to FIG. 2, a block flow diagram illustrates a representation of the self-limiting method in accordance with the present invention. The method includes monitoring a number of idle states and busy states in the disk drive. The performance of read/write commands that would cause one or more busy states in the disk drive is limited based on whether a sufficient number of the idle states has been monitored to avoid exceeding a duty cycle rating of the disk drive. Thus, at a high level, the disk drive keeps track of busy versus idle time and inserts time delays in responding to read/write requests in order to avoid exceeding the duty cycle rating of the disk drive. The invention allows for the average duty cycle to be limited based on a rolling average over a selectable time period to allow the disk drive to respond quickly to periods of high I/O activity without significantly decreasing the disk drive's performance but still limit the average duty cycle over a longer period of time in order to make sure the disk drive's intended duty cycle specifications are not exceeded.

Thus, in performing the monitoring of the self-limiting algorithm, each time the disk drive 10 is powered-on (step 20), the controller 12 will typically perform a self-test operation and upon successful completion, will enter the idle state to wait for commands from the host system 14 (step 21). In order to implement the duty cycle self-limiting invention, as soon as the disk drive 10 enters the idle state, the firmware of the controller 12 defines a timer variable, referred to as T, which can represent both positive and negative values, initializes T to 0, and sets the values of M and N based on a target duty cycle (step 22). When there is not a command waiting to be performed (as determined via step 23), the disk state is set to idle (step 25). For each time period that elapses while the disk drive 10 remains idle (as determined via step 26), N is added to the T value (step 27). Since most read/write operations performed by a disk drive 10 require several milliseconds to perform, using a time period of 1 ms for incrementing the timer T should be sufficient for most disk drives 10 and will be used as a working example for the description of the invention. As long as the disk drive remains idle, T will continue to increase by N once every millisecond.

In performing the limiting of the self-limiting algorithm, each time a read/write command is received by the disk drive 10 (step 23 is affirmative), the controller 12 checks T to see if the value is positive or negative (via step 24). If positive, the disk state is set to busy (step 28) and then the disk drive 10 can begin to perform the requested command (step 29); if negative or zero, then the disk drive 10 remains idle and delays processing of the new command until T is set to a positive number by the subsequent addition of N to the count value at the end of a future time period. As soon as the value of T is positive, command processing should begin. When the command is not yet completed (as determined via step 30), and 1 ms has elapsed since T was updated (determined via step 31), the disk drive 10 should decrement T by the value of M—N at the end of each successive time period (step 32). Once the command has been completed and the disk drive 10 enters the idle state, T should again be incremented by N at the end of every subsequent time period until another command is received. If this process is performed continually, the disk drive will automatically limit its duty cycle over the long term to the desired value.

As an example, FIG. 3 illustrates a table for a working example in accordance with the present invention. In this case, an assumption is made that the target duty cycle if 25% (i.e., N=1, M=4, M−N=3); command #1 arrives at the beginning of time period 4 and requires 2 time periods to perform; command #2 arrives at the beginning of time period 6 and requires two time periods to perform; command #3 arrives at the beginning of time period 11 and requires 3 time periods to perform. Note that the processing of command #2 is delayed by 3 time periods in order to limit the duty cycle of the disk drive and command #3 is delayed by 6 time periods. In this case, the disk drive does not have much idle time after power-on before commands begin being issued, so the running average duty cycle will exceed the target value of 25% at several points in time. However, the longer the disk drive operates, even under heavy load conditions, the closer the running average duty cycle will get to the target value of 25%.

If the disk drive was idle for a fairly long period of time prior to the arrival of commands, then the value of T would be very high when the first command arrived and the running average duty cycle would remain well below the target value of 25% unless a sustained burst of activity caused the value of T to be depleted. At that time, the running average duty cycle would reach the maximum 25% value and throttling of the duty cycle would automatically begin. This behavior of allowing the disk to essentially store up idle credits for later use makes this algorithm ideal for use in application environments which tend to have infrequent bursts of high duty cycle read/write command activity. This algorithm allows short high duty cycle bursts of commands to be serviced quickly without throttling for optimum performance, while still retaining the capability to limit the long term duty cycle in order to meet the disk drive's recommended usage guidelines and maintain the disk drive's rated reliability targets.

If desired, the duration of the maximum sustained burst of continuous activity can easily be controlled by setting an upper limit for the value of the timer/counter variable T. For example, if T was incremented by 1 every millisecond that the disk drive was idle as in the above example scenario, then by setting a maximum value of 60,000 for T and not incrementing T further after the counter had reached 60,000, the maximum sustained burst of activity would be limited to 20 seconds (i.e., when decrementing the counter by 3 for each time period that the disk drive is actively processing a command, as in the previous example). Thus, if the disk drive were idle for 60 seconds, and then busy continuously for the next 20 seconds, the average duty cycle at the end of that total period of 60 seconds would be $20/80$ or 25%, which was the desired value. Other maximum values of T could be chosen to allow the maximum busy burst time to be longer or shorter than this example depending upon the particular design of the disk drive.

If this invention is implemented as part of the disk drive's firmware, the customization of all the parameters used in this invention's algorithms can be best optimized for each particular disk drive's design and intended use, as is well appreciated by those skilled in the art. Further, this invention could alternatively be implemented in intelligent storage subsystem designs by embedding the algorithms of this invention in the firmware that is used to control the operation of RAID adapters or controllers that send commands to the individual disk drives.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A disk drive comprising:
   a storage disk; and
   a controller coupled to the storage disk and controlling data reads from and data writes to the storage disk by monitoring a number of idle states and busy states and limiting performance of read/write commands based on whether a sufficient number of idle states has been monitored to avoid exceeding a duty cycle rating of the disk drive, wherein the controller further:
   utilizes a time count that adjusts in accumulated value based on the number of idle states and busy states in the disk drive;
   determines whether the time count has an accumulated value that is greater than zero;
   performs a read/write command when the accumulated value is greater than zero; and
   delays performance of a read/write command until the accumulated value is greater than zero.

2. The disk drive of claim 1, wherein the time count increments by a first value for each idle state.

3. The disk drive of claim 2, wherein the time count decrements by a second value for each busy state.

4. The disk drive of claim 3, wherein the first value and the second value comprise a ratio of values based on a target duty cycle for the disk drive.

* * * * *